United States Patent [19]
Reiber

[11] Patent Number: 5,980,613
[45] Date of Patent: Nov. 9, 1999

[54] PRESSURIZED RADON STRIPPER

[75] Inventor: Harold Steven Reiber, Seattle, Wash.

[73] Assignee: HDR Engineering, Inc., Bellevue, Wash.

[21] Appl. No.: 08/603,253

[22] Filed: Feb. 20, 1996

[51] Int. Cl.⁶ .................................................. B01D 19/00
[52] U.S. Cl. ............................... 95/246; 95/248; 96/202
[58] Field of Search .................................. 95/22, 23, 245, 95/246, 248, 260, 263, 266; 96/202, 210

[56] References Cited

U.S. PATENT DOCUMENTS

| | | | |
|---|---|---|---|
| 3,154,087 | 10/1964 | Beaver | 95/263 |
| 3,161,490 | 12/1964 | Dudek . | |
| 3,282,030 | 11/1966 | Griffo et al. . | |
| 3,359,708 | 12/1967 | Barber . | |
| 3,481,113 | 12/1969 | Burnham, Sr. | 95/248 |
| 3,771,288 | 11/1973 | Wisman et al. . | |
| 3,771,290 | 11/1973 | Stethem . | |
| 4,123,800 | 10/1978 | Mazzei | 366/150 |
| 4,849,111 | 7/1989 | Abrams . | |
| 4,861,352 | 8/1989 | Cheng | 95/263 |
| 4,938,124 | 7/1990 | Garza . | |
| 4,940,473 | 7/1990 | Benham . | |
| 5,004,484 | 4/1991 | Stirling et al. | 95/263 |
| 5,100,555 | 3/1992 | Matson . | |
| 5,194,158 | 3/1993 | Matson . | |
| 5,203,891 | 4/1993 | Lema . | |
| 5,314,613 | 5/1994 | Russo | 95/263 |
| 5,338,341 | 8/1994 | Mazzei et al. | 96/210 |
| 5,354,459 | 10/1994 | Smith . | |
| 5,358,357 | 10/1994 | Mancini et al. . | |
| 5,393,417 | 2/1995 | Cox . | |
| 5,397,461 | 3/1995 | Augustin . | |
| 5,403,475 | 4/1995 | Allen | 95/246 |

FOREIGN PATENT DOCUMENTS

| | | | |
|---|---|---|---|
| 955976 | 9/1982 | Russian Federation | 96/202 |
| 1402582 | 6/1988 | Russian Federation | 96/202 |
| 1699496 | 12/1991 | U.S.S.R. . | |
| 249283 | 3/1926 | United Kingdom | 96/202 |
| 768537 | 2/1957 | United Kingdom . | |
| 2035828 | 6/1980 | United Kingdom | 96/202 |

OTHER PUBLICATIONS

Dixon et al.; Apr., 1991; Evaluating Aeration Technology for Radon Removal.

*Primary Examiner*—C. Scott Bushey
*Attorney, Agent, or Firm*—Lyon & Lyon LLP

[57] ABSTRACT

The present invention is a method and device for removing radon from groundwater without substantially reducing wellhead pressure. The pressurized radon stripper of the present invention has two principal components: a novel Venturi injector assembly which introduces air into a water process stream from a water source such as a well or the like; and a packed bed contactor which enhances air-liquid contact and serves as a gas-liquid separator. Over two thirds of the radon removal occurs in the Venturi injectors due to the intense gas-liquid turbulence in the throat of the Venturi valve.

19 Claims, 2 Drawing Sheets

PRESSURIZED RADON STRIPPER

FIELD OF THE INVENTION

The field of the invention relates generally to gas liquid separators, and specifically to a radon stripper that uses gas liquid turbulence to separate the gas from the liquid.

BACKGROUND OF THE INVENTION

Radon is a naturally occurring, water soluble, radioactive gas that evolves in the soil from the breakdown of heavier radioactive elements. Underground well water can transport the radon from the soil into the house, such as when taking a shower, doing laundry, washing dishes, or cooking with tap water. The Environmental Protection Agency (EPA) estimates that it takes about 10,000 picocuries per liter (pCi/L) of radon in water to contribute 1.0 pCi/L of radon in air throughout the house. The ratio of radon in water to radon in bathroom air while showering can be much higher, typically from 100 to 1; to about 300 to 1. The level of radon activity recommended by the EPA is only 4.0 pCi/L and is an "action level" based upon the correlation between radon exposure and lung cancer. Scientists believe radon exposure is the second leading cause of lung cancer and, in retrospect, it is now believed that many cases of "miner's disease" were cancers due to radon exposure.

When radon decays, it emits alpha particles. These are small, heavy, electrically charged, sub-atomic particles consisting of two protons and two neutrons. If an alpha particle strikes the chromosomes in a lung cell, it may alter the way that cell reproduces and, over time, develop into a recognizable cancerous growth.

Since radon is a sparingly soluble gas, it may be removed by gas/liquid separation processes. One method of gas/liquid separation is aeration. Aeration has traditionally been used in water treatment for degassification and odor removal. This process works by increasing the gas-liquid interface, allowing the dissolved gas to diffuse into the gas phase, and then removing the gas from the system. Aeration systems usually take one of three general forms: spray jet aeration, packed tower aeration, or multistaged bubble aeration.

Most prior art techniques for gas/liquid separation require that process flow be depressurized in order remove the radon from the liquid and then repressurized after stripping. Hence, these systems represent substantial expenses in terms of capital and operational costs. Additionally, there are situations where it would be impractical if not impossible to depressurize and then repressurize the process flow. The reason for this is that most prior art systems employing gas to strip radon require a gas/liquid ratio of about 20 to 1. This high gas/liquid ratio requires that the water flow stream be depressurized for radon stripping and then repressurized after stripping, which is labor intensive and expensive.

Another method of water purification is presented in U.S. Pat. No. 5,393,417 issued to Cox which discloses a water remediation and purification apparatus which includes a Venturi having a variably adjustable throat, sensor mechanism and controller which function to maximize the desired level of ozone produced by aggressive cavitation of a contaminated water stream. This apparatus is used to purify water in a process flow by producing free radicals which interact with the contaminants in the water and oxidize them. Thus, Cox discloses the use of a Venturi in a water stream in order to produce ozone to neutralize a multitude of impurities. As radon is a noble gas it can not be neutralized through oxidation process disclosed in Cox because the free radicals produced by the Cox ozone process will not react with radon.

U.S. Pat. No. 5,397,461 issued to Augustin discloses a water treatment system in which a Venturi is employed to thoroughly mix ozone supplied by a generator with water passing through the Venturi. Like the Cox purification system, the system disclosed in Augustin utilizes the introduction of ozone into a water flow to oxidize contaminants. Additionally, the contact chamber which removes the ozone from the water requires that the system be depressurized in order to allow ozone bubbles to expand in size.

There is a need for a compact, mechanically simple gas-stripping system suitable for installation on small to medium wellheads which is capable of removing radon from a pressurized process stream with minimal head loss. There is a further need for a gas-stripping system which can provide 70% radon removal efficiency achieved with an air to liquid volume ratio of less than 0.5 and an overall head loss of less than 25% of wellhead pressure.

SUMMARY OF THE INVENTION

The pressurized radon stripper of the present invention has two principal components: a Venturi injector assembly which introduces air into a water process stream from a water source such as a well or the like; and a packed bed contactor which enhances air-liquid contact and serves as a gas-liquid separator. Over two thirds of the radon removal occurs in the Venturi injectors due to the intense gas-liquid turbulence in the throat of the Venturi.

The pressurized radon stripper can be implemented as a self-contained strap-down skid-mounted unit that can be installed with minimal disruption to existing wellhead production. All water contact surfaces can be constructed of corrosion resistant materials. The unit is mechanically simple, and uses the motive force of the pressurized water flow to accomplish the stripping operation and little or no additional mechanical or electrical power is required.

The system is designed specifically for treatment of small to medium groundwater sources. Total head loss across the unit can be as low 25 psi for a 70% radon removal efficiency. A 100 gallon per minute treatment unit can be constructed to occupy a footprint of less than 10 feet and stands only 7 feet in height.

BRIEF DESCRIPTION OF THE DRAWINGS

The invention together with the further advantages thereof, may best be understood by reference to the following description taken in conjunction with the accompanying drawings in which.

DETAILED DESCRIPTION OF THE INVENTION

Figure 1:
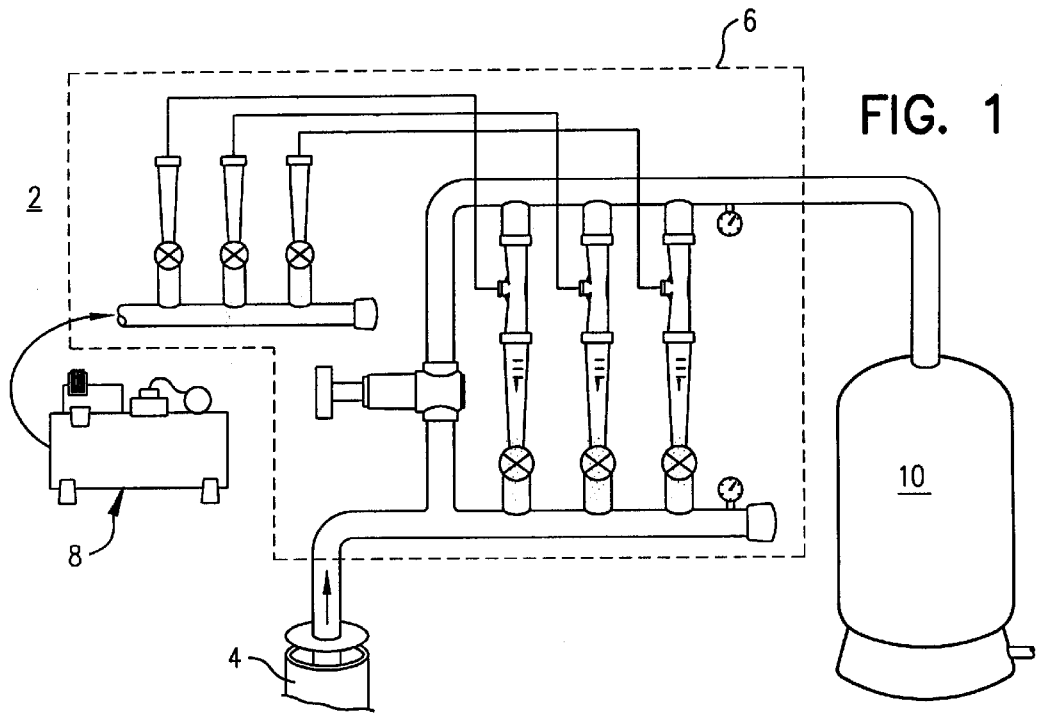
FIG. 1 is a schematic diagram of the present invention, a pressurized radon stripper.

FIG. 1 illustrates the present invention, a pressurized radon stripper 2 which can be used to remove radon from water under a variety of conditions. The pressurized radon stripper 2 treats water from a wellhead 4 or the like by combining air and the wellhead 4 water in a Venturi injector assembly 6 that is optionally connected to an external air source 8. The air/liquid combination is then optionally processed through a packed bed contactor/gas separator 10.

An important aspect of the present invention is that the Venturi injector assembly 6 results in a mixture having gas/liquid ratios of about 0.5 to 1. This allows the present invention to minimize head loss and thus be used in-line without "breaking head". "Breaking head" is defined as reducing pressure at a given point in a process stream. Because only a small amount of air is introduced to the flow stream, oxygen and nitrogen supersaturation of the treated water is avoided. The radon stripper 2 can also remove some of the dissolved carbon dioxide in the ground water, which is a benefit relative to corrosion control. The system of the present invention has a self flushing design which prevents solids build-up.

If a relatively high degree of head loss (greater than 40%) can be tolerated, the system will not require the external air source 8 and can be installed without the need for electrical power. To achieve a high degree of radon removal at minimal head loss, an external air source 8 is preferred. Most preferably radon stripper 2 operates at no less than 75 percent of the pressure of the water at the wellhead 4.

Figure 2:
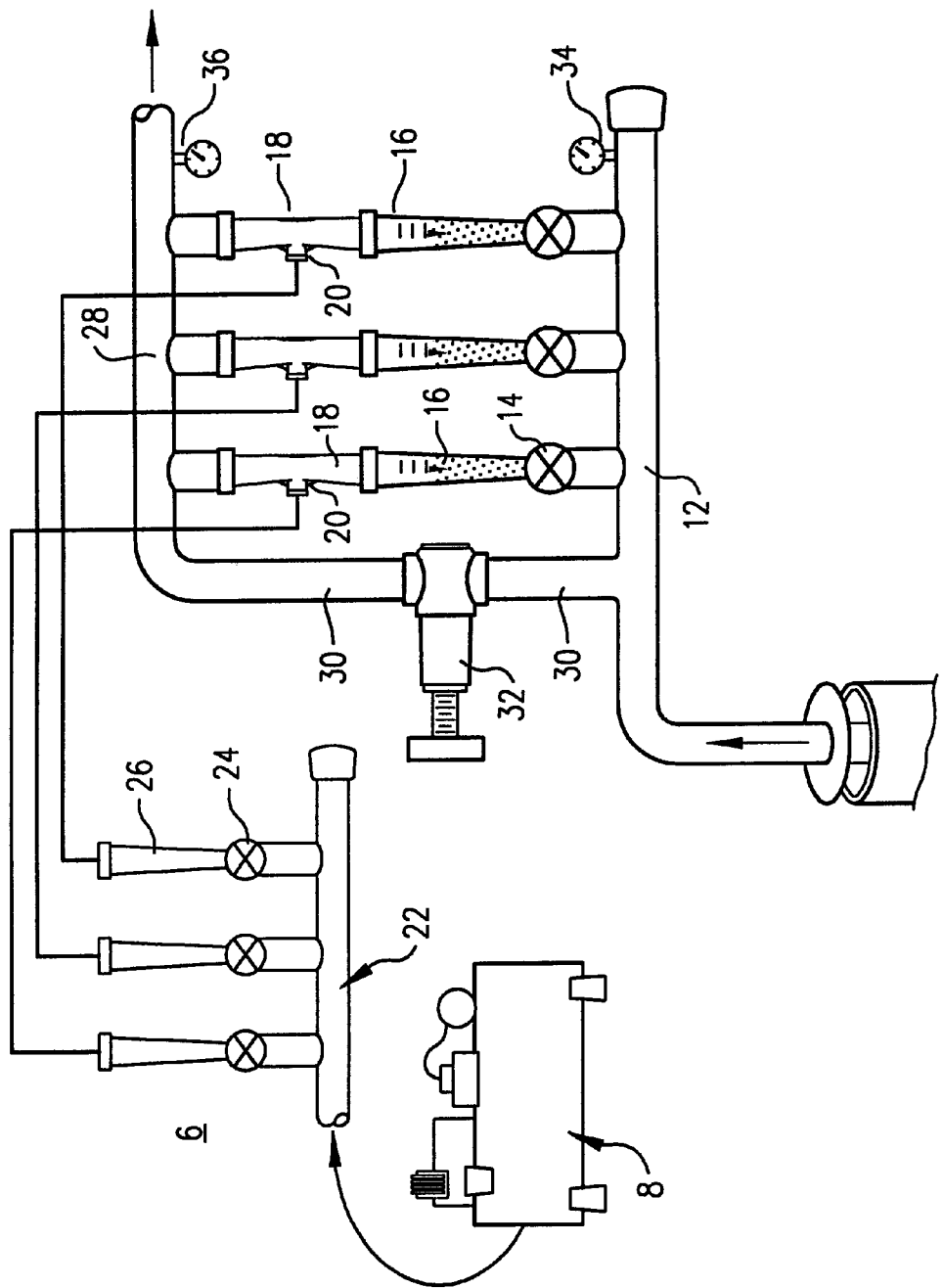
FIG. 2 is a schematic diagram of the Venturi injector assembly of the present invention.

FIG. 2 shows the Venturi injector assembly 6 in detail. Water is received from the wellhead 4 into water manifold 12 where it flows, under pressure, into one of a plurality of parallel throttling valves 14, through a liquid flow meter 16, and into a Venturi valve 18 which receives air through air inlet port 20. Venturi valve 18 has a body with a predetermined cross-sectional area and a throat with a cross-sectional area less than the cross-sectional area of the body. When water passes through the throat of Venturi valve 18, the decrease in cross-sectional area causes the pressure of the water to increase. Because the solubility of a gas in a liquid is proportional to its partial pressure above the liquid, increasing, and then suddenly decreasing, the pressure of a liquid can be used as a method to remove gas from the liquid. When the water exits the throat and enters the body of Venturi valve 18, it expands and atomizes thereby increasing the gas liquid interface and thereby allowing some of the radon to diffuse into the air. The increase in pressure in the throat of Venturi valve 18 also forces some of the radon to dissolve out of the water when the pressure drops upon exiting the throat and entering the body of Venturi valve 18.

Air is provided to the Venturi injector assembly 6 from an external air source 8 which feeds air into an air manifold 22 fitted with a plurality air throttling valves 24 which in turn connect to air flow meters 26. The air flow meters connect to the air inlet ports 20 of the Venturi valves 18. After mixing in the Venturi valves 18 the water and air flow into the combined air/liquid manifold 28. The air to liquid volume ratio in Venturi valve 18 is preferably less than 1.0 and is most preferably less than 0.5.

The air/liquid manifold 28 is also connected to the water manifold 12 by a short circuit pipe 30 fitted with a pressure relief valve 32. Under normal operation water may or may not flow from the water manifold 12 directly into the combined air liquid manifold 28 through short circuit pipe 30.

The water manifold 12 is fitted with a liquid pressure gauge 34 and the combined air/liquid manifold 28 is fitted with a combined air/liquid pressure gauge 36.

Figure 3:
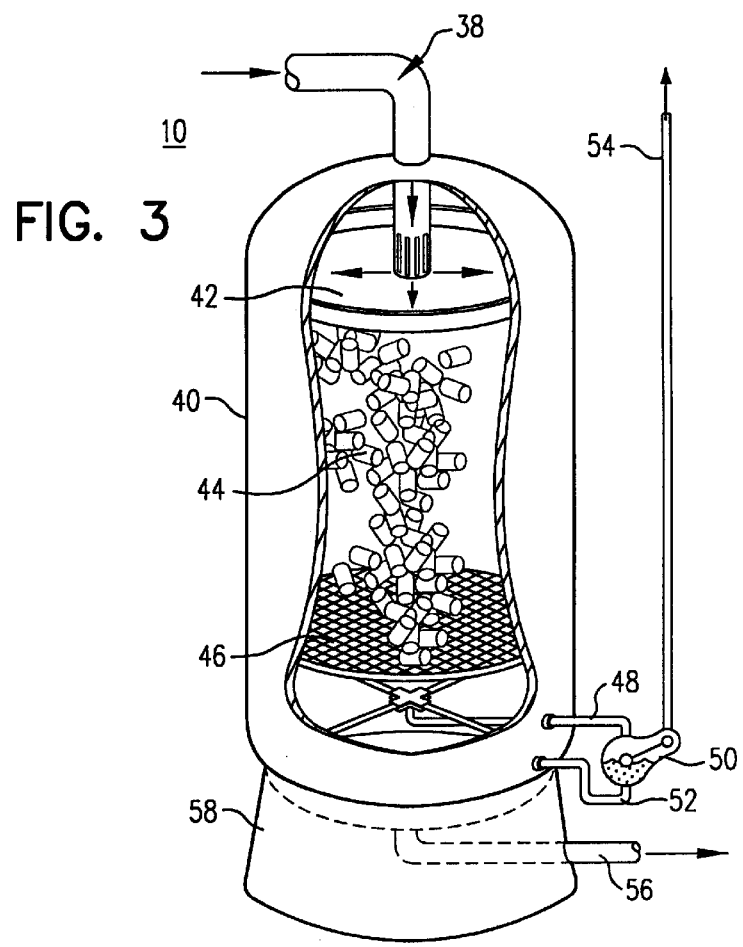
FIG. 3 is a partial-cutaway illustration of a prior art packed bed contactor/gas separator for use in the present invention.

FIG. 3 illustrates the packed bed contactor/gas separator 10 which receives the combined air and liquid from the combined air liquid manifold 28. Combined air/liquid inlet 38 is centrally disposed at the top of pressure vessel 40 where the air/liquid mixture from combined air/liquid manifold 28 flows across the surface of a distribution plate 42 centrally disposed within the top portion of the pressure vessel 40. The air liquid mixture flows uniformly through packing media 44 which is supported by a packing media support screen 46. Gas and air are removed from the pressure vessel 40 through a gas outlet 48 located below the level of the packing media support screen 46 in the sidewall of the pressure vessel 40. The gas outlet 48 is connected to an air relief valve 50 which is also connected to the pressure vessel through a fluid level measurement inlet 52. The air relief valve 50 releases gas from the pressure vessel through an air/radon vent 54. Air relief valve 50 is controlled by fluid depth in the pressure vessel 40 and continuous air release avoids pressure fluctuations in the process stream. The treated water leaves through a treated water outlet 56 at the bottom of pressure vessel 40. Packed bed contactor/gas separator 10 may also be provided with a support shroud 58.

While particular embodiments of the present invention have been described in some detail herein above, changes and modifications may be made in the illustrated embodiments without departing from the spirit of the invention.

We claim:

1. A method of removing radon from a water source comprising the steps of:

passing radon-containing water of a predetermined pressure from the water source through a Venturi valve having a body with a predetermined cross-sectional area and a throat with a cross-sectional area less than the cross-sectional area of the body;

introducing air into the water at the Venturi valve to separate at least a portion of the radon from the water;

maintaining the water pressure of the water passing through the Venturi valve at no less than 75 percent of the predetermined pressure of the water source;

passing the water from the Venturi valve through a packed bed gas/water separator having gas/water separation packing media therein;

providing a gas outlet for exit of the radon and air separated from the water: and maintaining the water pressure of the water passing through the packed bed gas/water separator at no less than about 75 percent of the predetermined pressure of the water source.

2. The method of claim 1 wherein the Venturi valve is in communication with a water flow meter.

3. The method of claim 2 wherein the water flow meter is in communication with a water throttle valve.

4. The method of claim 2 wherein the Venturi valve is in communication with a pressurized air source.

5. The method of claim 1 wherein the Venturi valve is in communication with an air throttle valve.

6. The method of claim 1 wherein the water source is divided into two water lines and the Venturi valve has a first end which communicates with one of the water lines and a second end which communicates with the other of the water lines.

7. A method of removing radon from a water source comprising the steps of:

passing radon-containing water of a predetermined pressure from the water source through a Venturi valve having a body with a predetermined cross-sectional area and a throat with a cross-sectional area less than the cross-sectional area of the body;

introducing air into the water at the Venturi valve to separate at least a portion of the radon from the water;

providing a gas outlet for exit of the radon and air separated from the water; and maintaining the water pressure of the water passing through the Venturi valve at no less than 75 percent of the predetermined pressure of the water source.

8. The method of claim 7 wherein the Venturi valve is in communication with a water flow meter.

9. The method of claim 8 wherein the water flow meter is in communication with a water throttle valve.

10. The method of claim 8 wherein the Venturi valve is in communication with a pressurized air source.

11. The method of claim 7 wherein the Venturi valve is in communication with an air throttle valve.

12. The method of claim 7 wherein the water source is divided into two water lines and the Venturi valve has a first end which communicates with one of the water lines and a second end which communicates with the other of the water lines.

13. The method of claim 7 further comprising the steps of:

passing the water from the Venturi valve through a packed bed gas/water separator having gas/water separation packing media therein; and maintaining the water pressure of the water passing through the packed bed gas/water separator at no less than about 75 percent of the predetermined pressure of the water source.

14. A method of removing radon from a water source comprising the steps of:

passing water of a predetermined pressure from the water source across two water lines with a first end of a Venturi valve communicating with one water line and a second end of the Venturi valve communicating with the other water line, the Venturi valve having a body with a predetermined cross-sectional area and a throat with a cross-sectional area less than the cross-sectional area of the body;

introducing air into the water at the Venturi valve to separate at least a portion of the radon from the water;

providing a gas outlet for exit of the radon and air separated from the water; and maintaining the water pressure of the water passing through the Venturi valve at no less than 75 percent of the predetermined pressure of the water source.

15. The method of claim 14 wherein the Venturi valve is in communication with a water flow meter.

16. The method of claim 15 wherein the water flow meter is in communication with a water throttle valve.

17. The method of claim 15 wherein the Venturi valve is in communication with a pressurized air source.

18. The method of claim 14 wherein the Venturi valve is in communication with an air throttle valve.

19. The method of claim 14 further comprising the steps of:

passing the water from the Venturi valve through a packed bed gas/water separator having gas/water separation packing media therein; and maintaining the water pressure of the water passing through the packed bed gas/water separator at no less than about 75 percent of the predetermined pressure of the water source.

* * * * *